(12) United States Patent
Kim et al.

(10) Patent No.: US 9,367,944 B2
(45) Date of Patent: Jun. 14, 2016

(54) TREE MODEL AND FOREST MODEL GENERATING METHOD AND APPARATUS

(71) Applicant: Electronics and Telecommunications Research Institute, Daejeon (KR)

(72) Inventors: Jae Hwan Kim, Daejeon (KR); Il Kwon Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 365 days.

(21) Appl. No.: 13/959,260

(22) Filed: Aug. 5, 2013

(65) Prior Publication Data

US 2014/0354630 A1    Dec. 4, 2014

(51) Int. Cl.
*G06T 13/60*    (2011.01)
*G06T 17/00*    (2006.01)

(52) U.S. Cl.
CPC ............. *G06T 13/60* (2013.01); *G06T 17/00* (2013.01)

(58) Field of Classification Search
None
See application file for complete search history.

(56) References Cited

U.S. PATENT DOCUMENTS

| 5,224,179 A | 6/1993 | Denker et al. |
| 7,917,346 B2 | 3/2011 | Sullivan et al. |
| 2009/0174703 A1* | 7/2009 | Hermanson ............ G06T 13/60 345/419 |

FOREIGN PATENT DOCUMENTS

| KR | 10-2005-0080650 | 8/2005 |
| KR | 10-2006-0108271 | 10/2006 |
| KR | 10-2006-0133671 | 12/2006 |
| KR | 10-2012-0001114 | 1/2012 |

OTHER PUBLICATIONS

Kim, Jaehwan et al., "LiveTree: Realistic tree growth stimulation tool," SIGGRAPH 2012, 1 page (2012).

* cited by examiner

*Primary Examiner* — Maurice L McDowell, Jr.
(74) *Attorney, Agent, or Firm* — Nelson Mullins Riley & Scarborough LLP

(57) ABSTRACT

Provided is a tree model generating method according to an embodiment of the present invention. The tree model generating method includes separating and extracting a skeleton of a tree from an image including the tree to generate a matte image, applying a graph representation scheme of a two-dimensional (2D) object to the matte image to generate an object skeleton graph, generating a depth information value in accordance with a predetermined rule and allocating the generated depth information value to each node on the object skeleton graph to generate a three-dimensional (3D) primary tree model, adding branches to the primary tree model based on a branch library constructed in advance and the predetermined rule to generate a secondary tree model, and performing self-growth representation with respect to the secondary tree model based on a distance between each node on the object skeleton graph to generate a tertiary tree model.

20 Claims, 10 Drawing Sheets

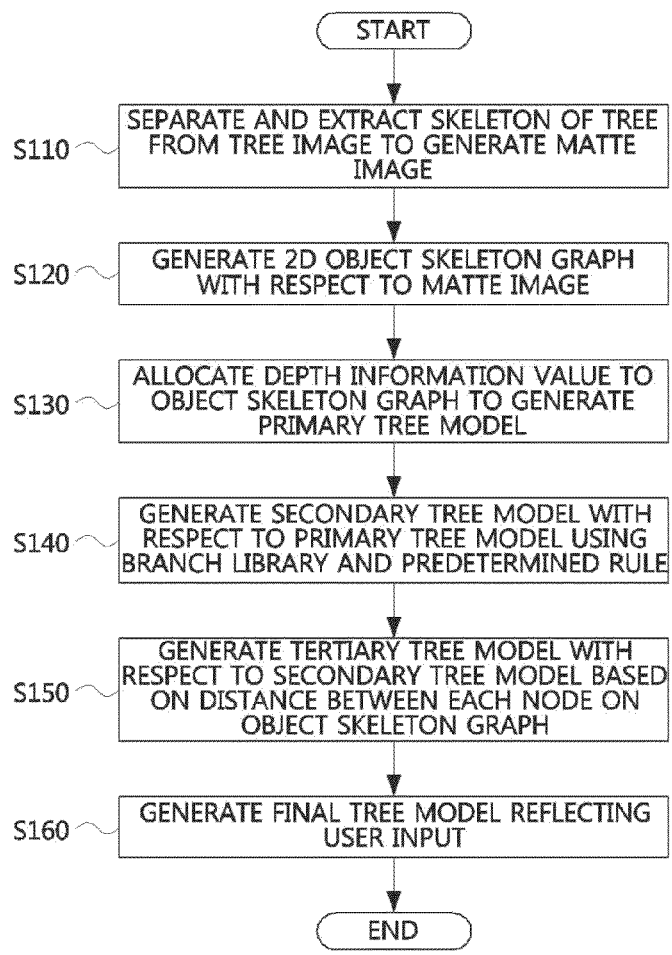
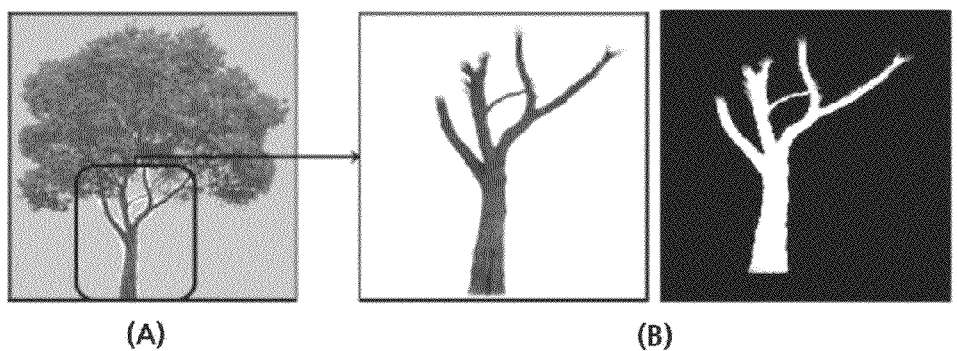

FIG. 3
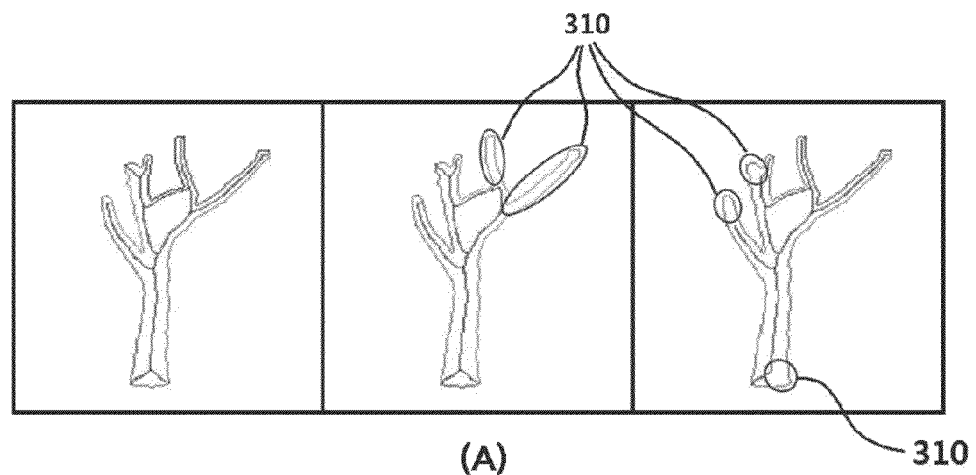
(A)
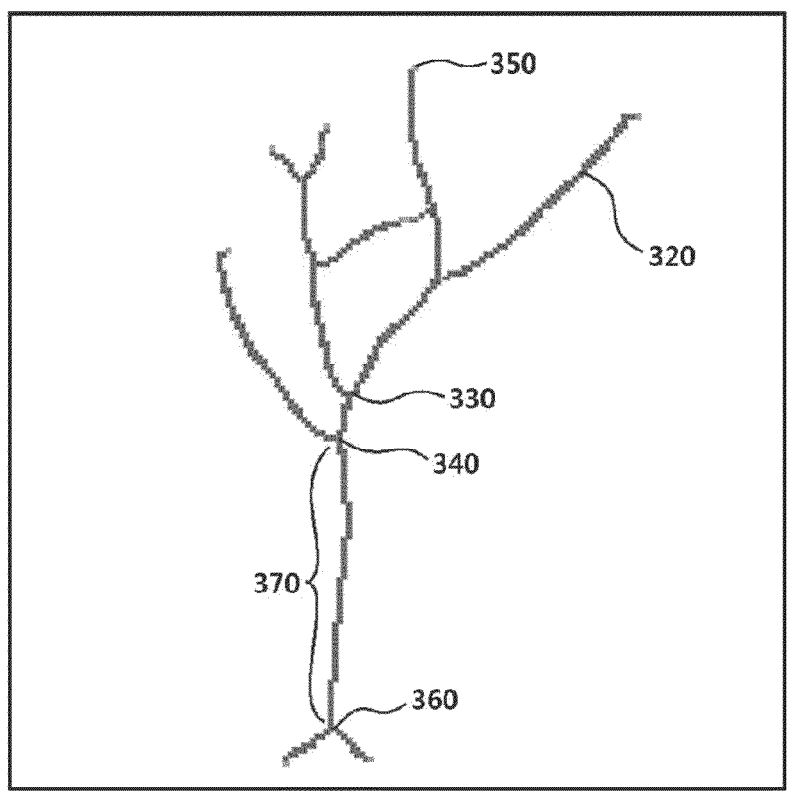
(B)

FIG. 4
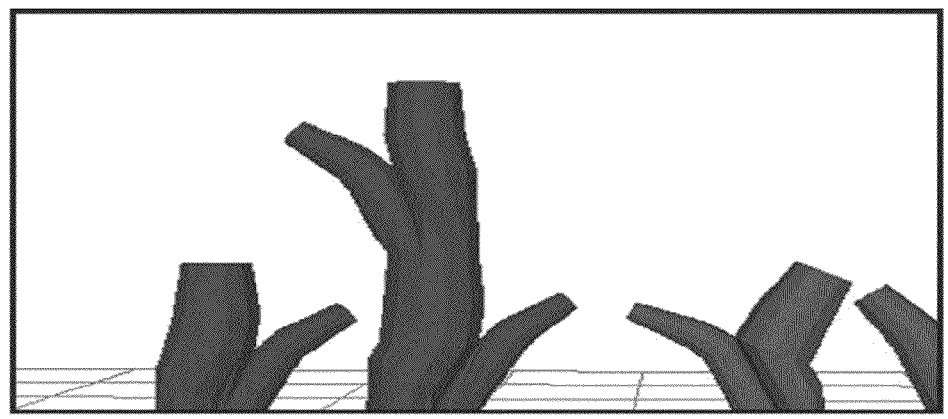
(A)
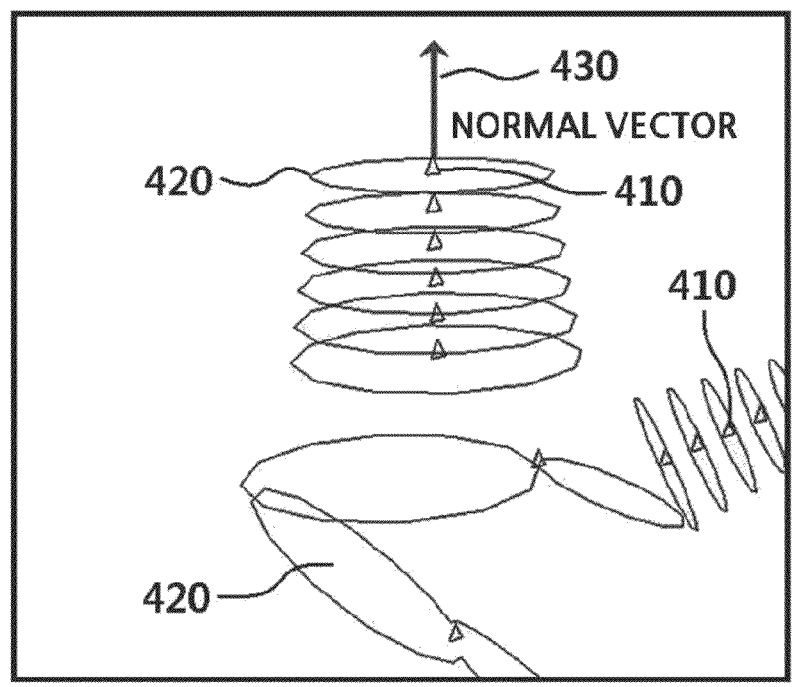
(B)

(A)  (B)

TREE MODEL AND FOREST MODEL GENERATING METHOD AND APPARATUS

CLAIM FOR PRIORITY

This application claims priority to Korean Patent Application No. 10-2013-0063868 filed on Jun. 4, 2013 in the Korean Intellectual Property Office (KIPO), the entire contents of which are hereby incorporated by reference.

BACKGROUND

1. Technical Field

Example embodiments of the present invention relate in general to a tree model and forest model generating method and apparatus, and more specifically to a method and apparatus for generating three-dimensional (3D) tree and forest models using tree photos and terrains.

2. Related Art

Natural objects such as trees, forests, and the like are very important elements as background contents of films and games. The related technologies may be roughly divided into two such as a three-dimensional (3D) tree model generating field and a 3D forest model generating field.

First, the 3D tree model generating field may be roughly divided into three conventional methods such as a rules-based tree modeling method, a user interactive tree modeling method, and an image-based tree modeling method.

First, a procedural method such as an L-system and fractal method or the rules-based tree modeling method generates repetitive tree skeletons using rules defined in advance or randomized variables of branch position function values. Such a rules-based tree modeling method is a classical method in generating a tree model, and has been widely used because it enables complex tree model generation through setting of less variable values. However, the rules-based tree modeling method has limitations such as difficulties in controlling the overall appearance of a tree and generating a tree having a user's desired shape.

Second, the user interactive tree modeling method is a 3D tree model generating method through a user's 2D sketch, and generates a tree model based on a producer's drawing including tree shapes and branch shapes. The user interactive tree modeling method is more user-intuitive compared to the existing rules-based tree modeling method, but has limitations that it requires a lot of efforts and proficiency of a user (or content producer) when generating a complex tree.

Third, the image-based tree modeling method is a method of generating a 3D tree model through image matching and an object structure restoration method using a plurality of pieces of tree images as inputs, but has an inherent accuracy problem in the methodology itself and requires a lot of manual labor in tree segment and skeletonization within images.

U.S. Pat. No. 7,917,346 relates to simulation in which branches spread from a tree trunk to a fixed specific position below a tree crown, and has very limited problems in realistic tree modeling and self-growth representation.

In addition, U.S. Pat. No. 5,224,179 relates to skeletonization of an object within an image, and extracts a skeleton of the object within the image by scanning templates defined in advance to the object. However, this has problems such as difficulties in accurate skeleton extraction of objects having high complexity with much noise of deformation and protrusion such as trees.

SUMMARY

Accordingly, example embodiments of the present invention are provided to substantially obviate one or more problems due to limitations and disadvantages of the related art.

Example embodiments of the present invention provide a method for generating a tree model that may accurately extract a tree skeleton without a lot of manual labor and represent self-growth.

Example embodiments of the present invention also provides a method for generating a forest model that may diversely arrange trees without a lot of manual labor and represent growth of forest.

Example embodiments of the present invention also provides an apparatus for generating a tree model which may accurately extract a tree skeleton without a lot of manual labor and represent self-growth.

In some example embodiments, a tree model generating method using a computing device includes: separating and extracting a skeleton of a tree from an image including the tree to generate a matte image; applying a graph representation scheme of a two-dimensional (2D) object to the matte image to generate an object skeleton graph; generating a depth information value in accordance with a predetermined rule and allocating the generated depth information value to each node on the object skeleton graph to generate a three-dimensional (3D) primary tree model; adding branches to the primary tree model based on a branch library constructed in advance and the predetermined rule to generate a secondary tree model; and performing self-growth representation with respect to the secondary tree model based on a distance between each node on the object skeleton graph to generate a tertiary tree model.

Here, the tree model generating method may further include reflecting, to the tertiary tree model, at least one shape element of the tree selected by a user through a user interface to generate at least one final tree model.

Also, in the separating and extracting of the skeleton of the tree, a user scribble-based matting scheme may be used to generate the matte image.

Also, the applying of the graph representation scheme may include configuring a convex hull with respect to the matte image generated in the separating and extracting of the skeleton of the tree, extracting a minimal critical point for constituting a shape of a skeleton on the convex hull, segmenting contours of an object on the convex hull with respect to the extracted critical point, and removing a skeleton line included in the same contour to extract the skeleton line that refers to mutually different contours. Here, in the extracting of the minimal critical point, interaction with a user through a user interface may be allowed.

Also, the object skeleton graph generated in the applying of the graph representation scheme may be represented as a directed acyclic graph (DAG), a single pixel may be allocated for each node, a bifurcation of the branch may be represented as a junction node, and an end point of the branch may be represented as an end node.

Also, the generating of the depth information value may include generating the 3D tree model on the assumption that each node on the object skeleton graph is more diverged as a distance from a root node is longer, and measuring depth information values of a first junction node directly connected to the root node and of nodes between the root node and the junction nodes in a similar manner.

Also, in the adding of the branches, a divergency angle of each critical node on the primary tree model and branch length information may be used when generating the secondary tree model.

Also, the performing of the self-growth representation may include measuring a geodesic distance between each node on the object skeleton graph generated in the applying of the graph representation scheme and a geodesic distance from each node to a root node, and setting the measured distances as branch-ordering values for determining the order of growth of the branches, and performing self-growth representation with respect to the secondary tree model using the branch-ordering values to generate the tertiary tree model.

Also, the branch-ordering value may be set to satisfy a condition in which speeds of the order of growth of the branches are proportional to branch thicknesses and inversely proportional to a distance from the root node to the branches.

In other example embodiments, a forest model generating method includes: receiving, from a user, an arrangement region for grouping and arranging tree models on a specific terrain model displayed on a computer screen; extracting position information for arranging the tree models on the received arrangement region using at least one arrangement pattern set in advance; arranging at least one type of tree model generated in advance on the arrangement region based on the extracted position information to generate a primary forest model; and performing self-growth representation, with respect to the primary forest model, of a forest to which a predetermined growth factor of the forest is applied to generate a secondary forest model.

Here, the forest model generating method may further include generating a final forest model in which a user input is reflected to the secondary forest model through a user interface.

Also, in the generating of the final forest model, at least one of a type and shape of each of trees grouped on the primary forest model or the secondary forest model, a rotation method of a tree shaft, a tropism direction of the tree, presence and absence of leaves, and a growth representation method of the tree may be provided so as to be edited through the user interface.

In still other example embodiments, a tree model generating apparatus that receives an image including a tree to generate a tree model includes: a matte image generating unit configured to separate and extract a skeleton of the tree from the image including the tree to generate a matte image using a user scribble based-matting scheme; an object skeleton graph generating unit configured to apply a graph representation scheme of a 2D object to the matte image to generate an object skeleton graph; a primary tree model generating unit configured to generate a depth information value in accordance with a predetermined rule and allocate the generated depth information value to each node on the object skeleton graph to generate a 3D primary tree model; a secondary tree model generating unit configured to add branches to the primary tree model based on a branch library constructed in advance and the predetermined rule to generate a secondary tree model; and a tertiary tree model generating unit configured to perform self-growth representation with respect to the secondary tree model based on a distance between each node on the object skeleton graph to generate a tertiary tree model.

Here, the tree model generating apparatus may further include an image visualization unit configured to display at least one image of the image including the tree, the matte image, the object skeleton graph, the primary tree model, the secondary tree model, and the tertiary tree model on a screen; and a user menu providing unit configured to provide a user menu so that the image displayed through the image visualization unit is edited by the user.

Also, the object skeleton graph generating unit may configure a convex hull with respect to the matte image generated in the matte image generating unit, extract a minimal critical point for constituting a shape of a skeleton on the convex hull, segment contours of an object on the convex hull with respect to the extracted critical point, and remove a skeleton line included in the same contour to extract the skeleton line that refers to mutually different contours.

Also, the object skeleton graph generated in the object skeleton graph generating unit may be represented as a DAG, a single pixel may be allocated for each node, a bifurcation of the branch may be represented as a junction node, and an end point of the branch may be represented as an end node.

Also, the primary tree model generating unit may generate the 3D tree model on the assumption that each node on the object skeleton graph is more diverged as a distance from a root node is longer, and measure depth information values of a first junction node directly connected to the root node and of nodes between the root node and the junction nodes in a similar manner.

Also, the secondary tree model generating unit may use a divergency angle of each critical node on the primary tree model and branch length information when generating the secondary tree model.

Also, the tertiary tree model generating unit may measure a geodesic distance between each node on the object skeleton graph and a geodesic distance from each node to a root node, and perform self-growth representation with respect to the secondary tree model using the measured distance as a branch-ordering value for determining the order of growth of the branches, to generate the tertiary tree model.

Also, the branch-ordering value may be set to satisfy a condition in which speeds of the order of growth are proportional to branch thicknesses and inversely proportional to a distance from the root node to the branches.

BRIEF DESCRIPTION OF DRAWINGS

Example embodiments of the present invention will become more apparent by describing in detail example embodiments of the present invention with reference to the accompanying drawings, in which:

FIG. 1 is a flowchart illustrating a tree model generating process according to an embodiment of the present invention;

FIGS. 2A and 2B are conceptual diagrams illustrating an alpha matte image generated in a tree model generating process according to an embodiment of the present invention;

FIGS. 3A and 3B are conceptual diagrams illustrating an object skeleton graph generated in a tree model generating process according to an embodiment of the present invention;

FIGS. 4A and 4B are conceptual diagrams illustrating a branch library which is referred to in a tree model generating process according to an embodiment of the present invention;

DESCRIPTION OF EXAMPLE EMBODIMENTS

Figure 5:
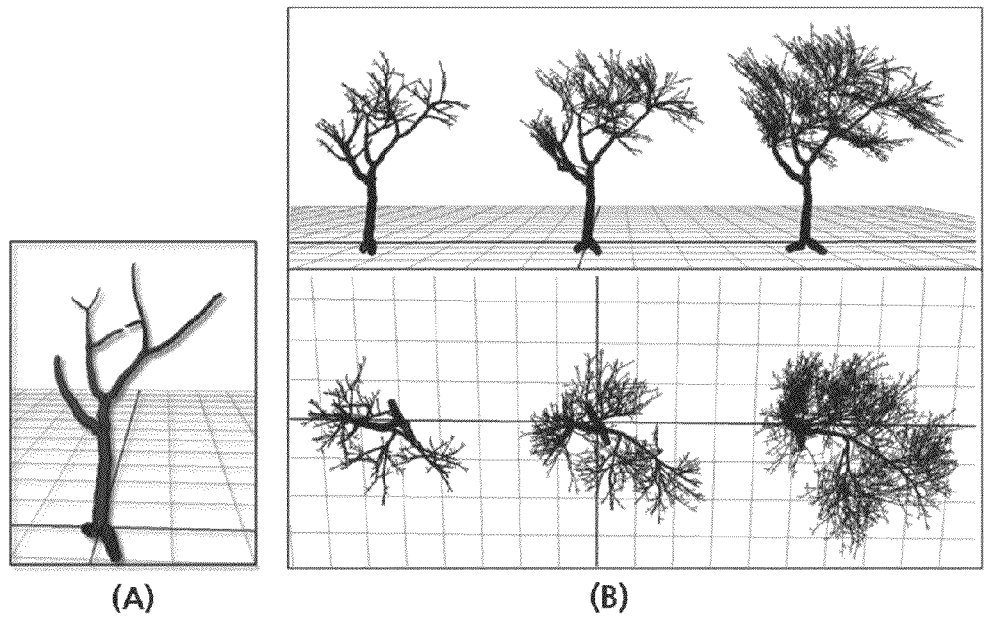
FIGS. 5A and 5B are conceptual diagrams illustrating a tree model generated in a tree model generating process according to an embodiment of the present invention.

Example embodiments of the present invention are disclosed herein. However, specific structural and functional details disclosed herein are merely representative for purposes of describing example embodiments of the present invention, and example embodiments of the present invention may be embodied in many alternate forms and should not be construed as being limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises", "comprising, ", "includes," and/or "including", when used herein, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a method for generating a tree model and a forest model according to an embodiment of the present invention and an apparatus for the same are disclosed.

The present invention aims to provide a method and apparatus for generating three-dimensional (3D) virtual tree models having a tree trunk and various tree crowns similar to a corresponding tree from one piece of 2D tree image, and generating a forest including tree models generated on an arbitrary terrain model.

In addition, the present invention aims to develop various intention representation technologies such as a forest shape, planting position extraction type, self-growth simulation of trees within a forest over time, and the like.

In order to achieve these technical challenges, as examples of the detailed technologies to be performed, accurate extraction of a tree object within an image including a complex background, accurate skeletonization and graph representation with respect to an extracted 2D tree trunk, conversion representation of a 2D tree skeleton to a 3D skeleton, modeling of a whole tree and user control based on a given tree trunk model, self-growth simulation representation of tree in which a branch thickness, a tree size, and a branching order are reflected, branch tropism representation due to an external force, generation of an arbitrary terrain or visualization representation of a terrain model, group region setting by a user, high-speed extraction of planting position value within the region, automatic arrangement of tree group within the set region, self-growth simulation representation of grouped trees in accordance with user setting, and the like may be given.

Hereinafter, preferred embodiments of the present invention will be described in detail with reference to the accompanying drawings. In the drawings and description, elements that appear in more than one drawing and/or elements that are mentioned in more than one place in the description are always denoted by the same respective reference numerals and are not described in detail more than once.

FIG. 1 is a flowchart illustrating a tree model generating process according to an embodiment of the present invention.

Referring to FIG. 1, the tree model generating process according to an embodiment of the present invention may include operation S110 of generating a matte image, operation S120 of generating an object skeleton graph, operation S130 of generating a primary tree model, operation S140 of generating a secondary tree model, operation S150 of generating a tertiary tree model, and operation S160 of generating a final tree model.

Referring to FIG. 1, each operation of the tree model generating process according to an embodiment of the present invention will be described as follows.

First, in operation S110, by displaying a received image including a tree on a screen of a computing device, and separating and extracting a skeleton of the tree from a corresponding tree image, an alpha matte image may be generated.

In this instance, using a user scribble-based matting scheme, the alpha matte image may be generated. An example of the alpha matte image generated in this operation is shown in FIGS. 2A and 2B.

FIGS. 2A and 2B are conceptual diagrams illustrating an alpha matte image generated in a tree model generating process according to an embodiment of the present invention.

Referring to FIG. 2A, a tree trunk and branches shown in a tree image including a complex background are separated and extracted using the user scribble-based matting scheme, and an alpha matte image of the tree trunk and branches is shown in FIG. 2B as the result of the separation and extraction.

Next, in operation S120, an object skeleton graph is generated by applying a graph representation scheme of a 2D object to the alpha matte image generated in operation S110, and in this instance, user interaction through a user interface may be allowed.

That is, a tree trunk with twigs is skeletonized as 2D, and represented as a graph. The alpha matte image extracted in operation S110 is received and re-skeletonized using the graph representation technology of the 2D object that is controlled by a user. Such a method has an advantage that it accurately extracts a skeleton of a corresponding object even in an object having a lot of deformations and protrusions such as a tree.

More specifically, according to the present invention, a convex hull is configured with respect to the matte image generated in operation S110, and a minimal critical point for constituting a shape of the skeleton on the configured convex hull is extracted.

Next, contours of an object on the convex hull are segmented with respect to the extracted critical point, and a skeleton line included in the same contour is removed, thereby extracting only the skeleton line that refers to mutually different contours.

In addition, in order to more accurately extract the skeleton line of the object, user interaction with respect to extraction selection may be allowed when extracting the minimal critical points constituting the convex hull shape of the object.

In this instance, the generated object skeleton graph is represented as a directed acyclic graph (DAG), a single pixel is allocated for each node, a bifurcation of the branch is represented as a junction node, and an end point of the branch is represented as an end node.

An example of the object skeleton graph generated in operation S120 is shown in FIG. 3.

FIGS. 3A and 3B are conceptual diagrams illustrating an object skeleton graph generated in a tree model generating process according to an embodiment of the present invention.

Referring to FIG. 3A, different skeletons with respect to the same object may be obtained due to mutually different critical points 310 constituting the convex hull shape of the object.

In addition, as described above, referring to FIG. 3B, the following restriction condition should be satisfied when representing the tree skeleton as a graph. The graph is represented as a DAG, a single pixel is allocated to one node 320, a bifurcation of the branch is represented as junction nodes 330 and 340, and an end point of the branch is represented as an end node 350.

In operation S130 of generating the primary tree model, a depth information value is generated in accordance with a predetermined rule and allocated to each node on the object skeleton graph generated in operation S120, thereby generating a 3D primary tree model.

That is, conversion of a 2D tree skeleton into a 3D prototype and construction of a whole 3D tree model are performed with respect to the object skeleton graph. Here, the primary purpose of the conversion of the 2D tree skeleton into the 3D prototype is to generate the depth information value in each node 320 within the object skeleton graph and allocate the generated depth information value so that a tree naturally viewed in various viewpoints is generated while maintaining a geometry structure of the critical branches of an original image.

Referring to FIGS. 3A and 3B, according to an embodiment of the present invention, on the assumption that critical nodes (junction nodes and end nodes) within the graph are more diverged as a distance from a root node 360 extracted as a root is longer, a 3D representation is performed. However, a first junction node 340 directly connected to the root node 360 and nodes 370 between the nodes 340 and 360 are measured in a similar manner.

In a direction similar to an average normal line direction of adjacent nodes (regarded as a branch direction), depth values of the remaining critical nodes follow a distribution of $Z \sim N(\mu_{\hat{z}}, \sigma_{\hat{z}})$. Here, $\hat{z}$ denotes a depth value of corresponding adjacent critical nodes.

In operation S140 of generating the secondary tree model, branches are added to the primary tree model based on a branch library constructed in advance and a predetermined rule, thereby generating a secondary tree model. In this instance, a divergency angle of each critical node on the primary tree model and branch length information are used.

That is, in order to generate a whole tree model with respect to the primary tree model that is a 3D initial tree model, branches are added to the given primary tree model using various types of branch libraries constructed in advance and predetermined rules, thereby generating the whole tree model.

In this instance, the divergency angle of each of the critical nodes on the primary tree model generated in operation S130 and a branch length value are utilized. In addition, the divergency angle and the branch length value may be utilized to generate a branch model defined in advance so as to maintain a feeling of the generated tree shape.

Examples of the above-described branch library and the tree model generated through operation S130 of generating the primary tree model and operation S140 of generating the secondary tree model are shown in FIGS. 4A to 5B.

FIGS. 4A and 4B are conceptual diagrams illustrating a branch library which is referred to in a tree model generating process according to an embodiment of the present invention.

In FIG. 4A, four different types of branch models constructed in advance are shown in a branch library, and in FIG. 4B, a graph node 410 displayed as a triangle, a 3D branch section 420 displayed as an oval corresponding to the graph node 410, and a branch direction 430 displayed as an arrow are shown, which shows a relationship between the 3D branch model and the graph node.

FIGS. 5A and 5B are conceptual diagrams illustrating a tree model generated in a tree model generating process according to an embodiment of the present invention.

In FIG. 5A, the primary tree model that is the initial tree model generated in operation S130 is shown, and in FIG. 5B, various examples of the secondary tree model that is a whole tree model generated from the primary tree model shown in FIG. 5A through operation S140 of generating the secondary tree model are shown.

In addition, referring to FIG. 5B, a process in which more branches are added from a left side toward a right side.

In operation S150 of generating the tertiary tree model, based on a distance between each node on the object skeleton graph generated in operation S120, self-growth representation is performed with respect to the secondary tree model, thereby generating the tertiary tree model.

That is, a geodesic distance between each node on the object skeleton graph and a geodesic distance from each node to a root node may be measured, and the measured distances may be set as branch-ordering values for determining the order of growth of the branches.

Next, by performing self-growth representation with respect to the secondary tree model using the branch-ordering values, the tertiary tree model is generated, and in this instance, the branch-ordering value may be set so that speeds of the order of growth of the branches are proportional to branch thicknesses and inversely proportional to a distance from the root node to the branches.

That is, more specifically, operation S150 may be expressed as a tree model self-growth representation operation, the geodesic distance between nodes existing on a tree manifold space is measured utilizing a graph structure of the tree object obtained as results of skeletonization of a tree trunk as 2D and representation as a graph in operation S120, and then the geodesic distance from each node to the root node may be used as the branch-ordering value for determining the order of growth of branches.

In addition, in operation S150 as described above, on the three assumptions, self-growth representation is performed with respect to the whole tree model (secondary tree model) generated in operation S140. Here, the three assumptions are as follows.

First, a newly generated branch node is farthest from the root node.

Second, the branch having a thinner thickness than adjacent branches is highly likely to be a recently and newly generated branch.

Third, a whole shape of the tree must be roughly maintained through the overall growth process, but a geometric shape is not the same.

Such assumptions may be represented as the following Equation 1.

$$T(i \neq r) = \|\Phi(x_i) - \Phi(x_r)\|^{-2},$$

s.t. $\Phi(\cdot)$ nonlinear transform function mapping from input space to feature space (for measuring Euclidean distance in tree manifold space)

$$M(j \neq r) \propto T(j)^{-1}$$

s.t. $0 < M(\cdot) \leq 1$, $j$ index of recently generated branch node $$R(x_{j \neq r}) \propto T(j),$$

s.t. $0 < R(\cdot) \leq EDT(x_r)$, Set EDT value of root node as maximum thickness value  [Equation 1]

In Equation 1, $x_i$ denotes an i-th node, r denotes a root index, and $EDT(x_i)$ denotes Euclidean distance transform in the i-th node for measuring a branch thickness. T(i) denotes a growth age in the i-th node, and adversely proportional to a branch-ordering value. M(j) denotes a scaling value for controlling an overall tree size, and $R(x_j)$ denotes a branch thickness value in a j-th node.

Through such assumptions, a tree self-growth simulation representation in which growth representation elements such as a branch thickness, a tree size, and branching orders are reflected is performed.

In addition, such growth representation elements are adjusted in accordance with user intention through a user interface, and therefore various tree self-growth representations are possible.

Figure 6:
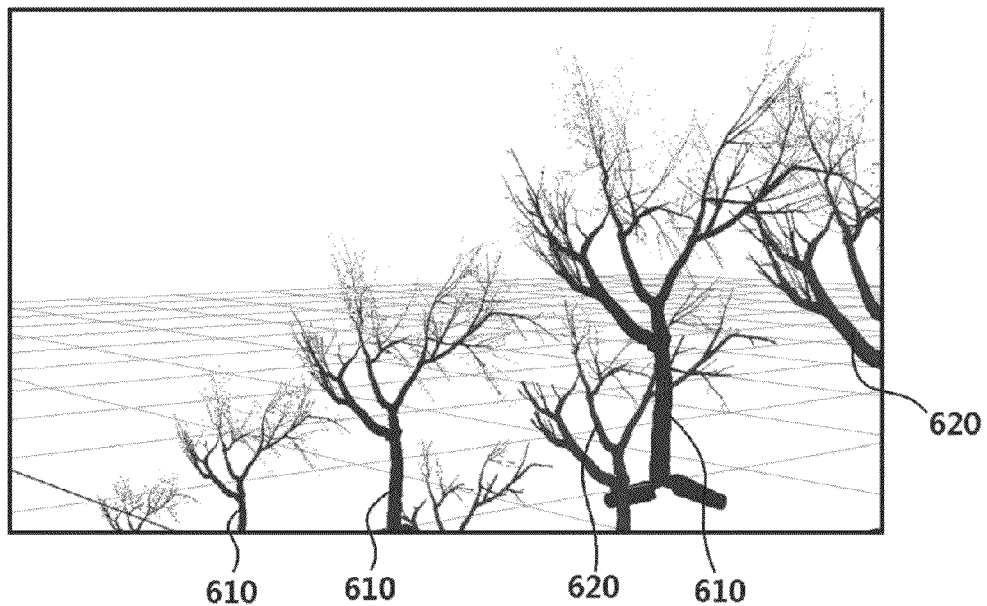
FIG. 6 is a conceptual diagram illustrating self-growth representation of a tree generated in a tree model generating process according to an embodiment of the present invention.

An example of the self-growth representation of the tree generated in operation S150 is shown in FIG. 6.

FIG. 6 is a conceptual diagram illustrating self-growth representation of a tree generated in a tree model generating process according to an embodiment of the present invention.

Referring to FIG. 6, trees 610 displayed on the left side are examples of growth representation considering only adjustment of an overall size of the tree, and trees 620 displayed on the right side are examples of growth representation considering the three elements of Equation 1.

In operation S160 of generating the final tree model, a final tree model in which a user input is reflected to the tertiary tree model is generated through a user interface. That is, by reflecting, to the tertiary tree model generated in operation S150, shape elements of a tree selected by a user through the user interface, for example, presence and absence of leave setting, a degree of richness of twigs, a tropism direction and degree of twigs, and the like, various tree models may be generated.

Figure 7:
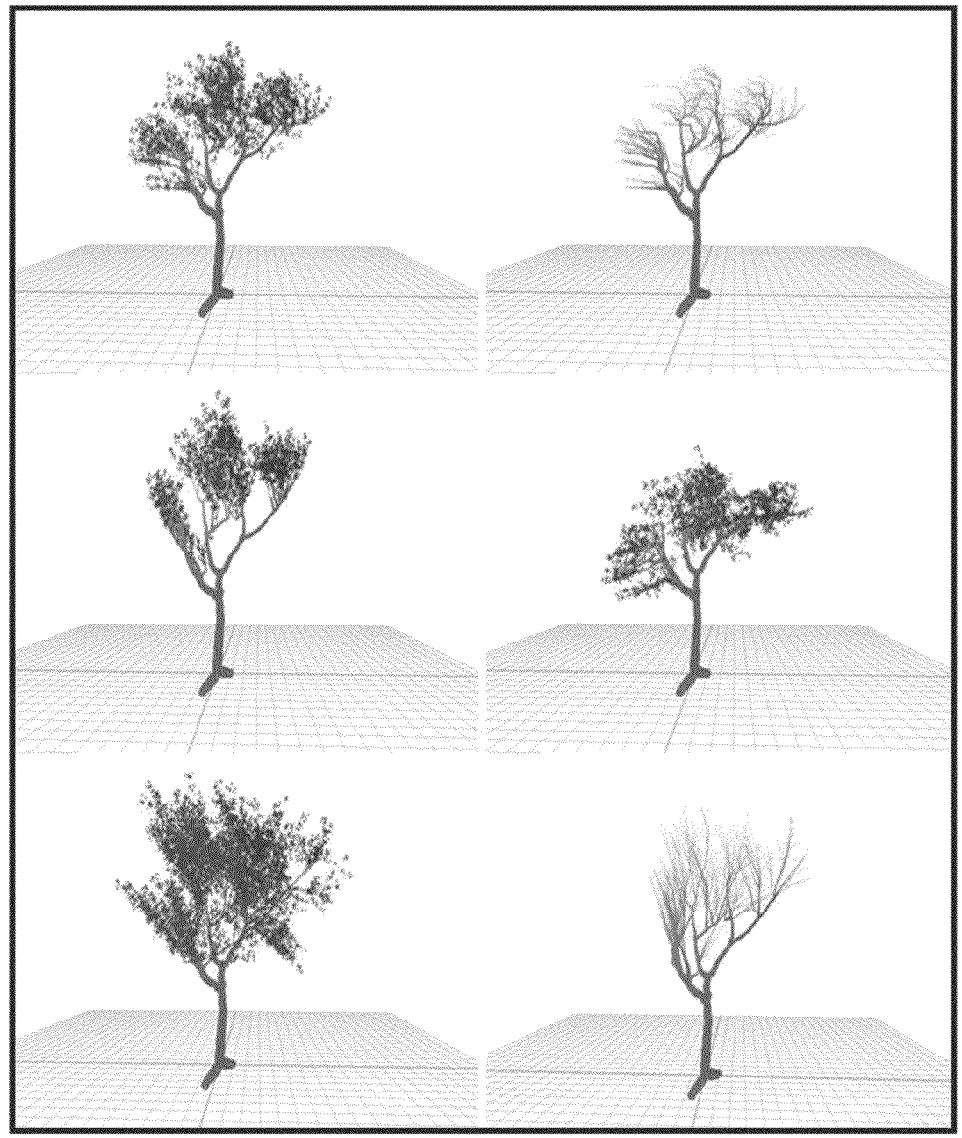
FIG. 7 is a conceptual diagram illustrating various tree models obtained by reflecting user inputs to a tree model generated in a tree model generating process according to an embodiment of the present invention.

FIG. 7 is a conceptual diagram illustrating various tree models obtained by reflecting user inputs to a tree model generated in a tree model generating process according to an embodiment of the present invention.

Referring to FIG. 7, there is shown an example of the final tree model that is subjected to various tree modeling by reflecting, to the primary tree model (see (a) of FIG. 5A) that is the initial tree model generated in operation S130 of generating the primary tree model, the presence and absence of leave setting, the degree of richness of twigs, the tropism direction and degree of twigs, and the like which are the tree shape elements received through the user interface.

Figure 8:
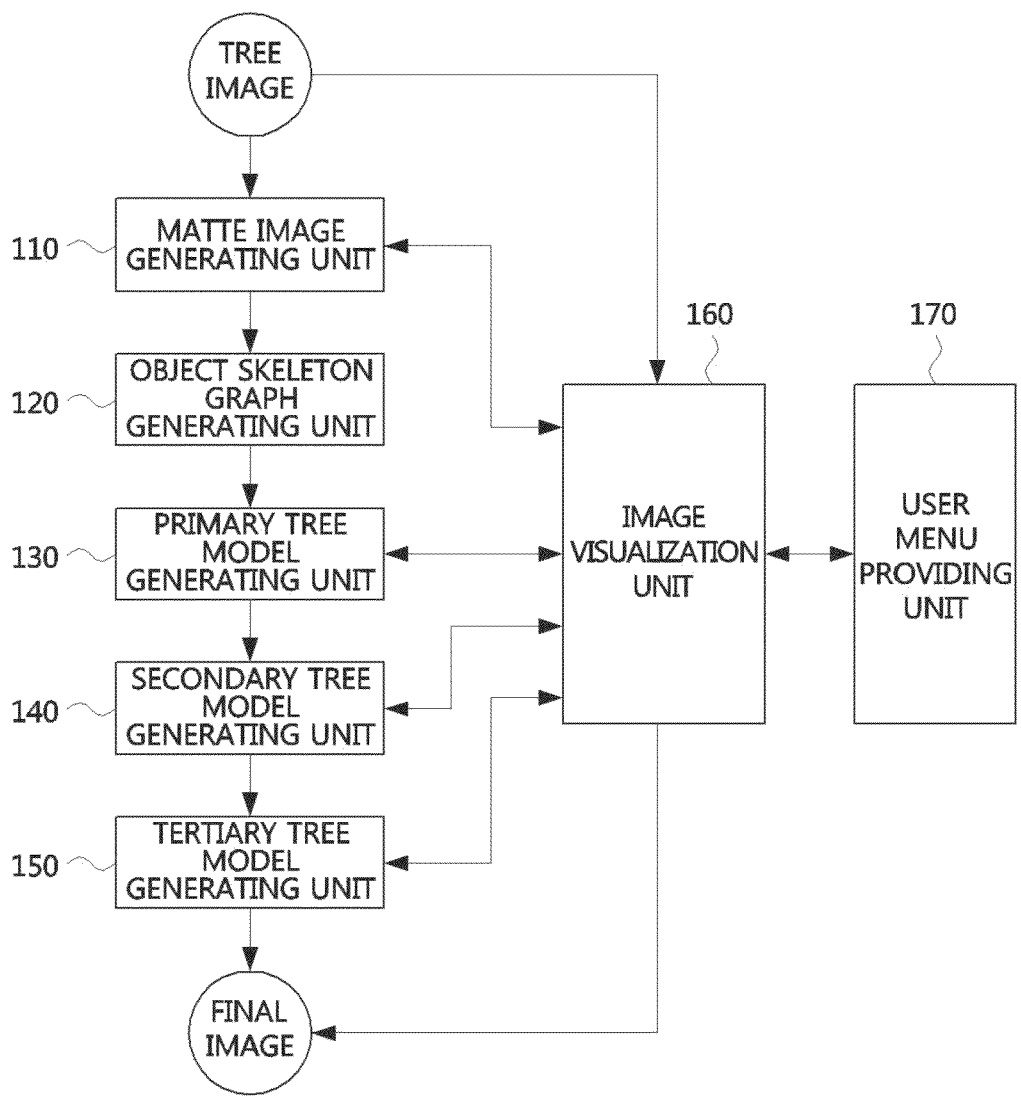
FIG. 8 is a block diagram illustrating a configuration of a tree model generating apparatus according to an embodiment of the present invention.

FIG. 8 is a block diagram illustrating a configuration of a tree model generating apparatus according to an embodiment of the present invention.

Referring to FIG. 8, the apparatus for generating the tree model according to an embodiment of the present invention may include a matte image generating unit 110, an object skeleton graph generating unit 120, a primary tree model generating unit 130, a secondary tree model generating unit 140, a tertiary tree model generating unit 150, an image visualization unit 160, and a user menu providing unit 170.

Figure 9:
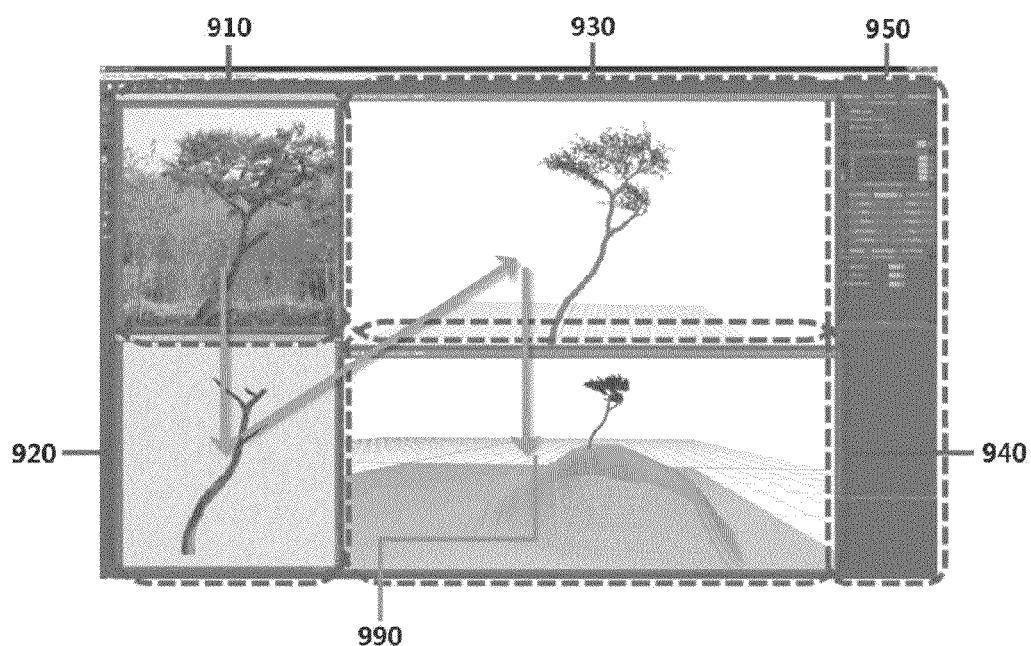
FIG. 9 is a conceptual diagram illustrating a user interface structure of a tree model generating apparatus according to an embodiment of the present invention.

FIG. 9 is a conceptual diagram illustrating a user interface structure of a tree model generating apparatus according to an embodiment of the present invention.

Referring to FIG. 9, the user interface of the tree model generating apparatus according to an embodiment of the present invention includes image visualization regions 910, 920, 930, and 940 for showing images generated through the tree model generating apparatus and a user edition menu 950. The generated tree model may be displayed on the image visualization regions 910, 920, 930, and 940 in an arrow direction 990 in accordance with a growth-order.

Referring to FIGS. 8 and 9, the role of each component of the tree model generating apparatus according to an embodiment of the present invention and a relationship between the components will be described as follows.

The image visualization unit 160 receives an image including a tree, and displays a corresponding tree image on a specific region 910 of a screen.

The matte image generating unit 110 separates and extracts a skeleton of a tree from the received image including the tree to generate an alpha matte image. In this instance, using a user scribble-based matting scheme, an alpha matte image may be generated. The alpha matte image generated in this manner may be displayed on a matte image region 920 designated in advance on the screen through the image visualization unit 160.

The object skeleton graph generating unit 120 applies a graph representation scheme of a 2D object with respect to the alpha matte image generated in the matte image generating unit 110 to generate an object skeleton graph. In this instance, user interaction through the user interface may be allowed.

That is, the object skeleton graph generating unit 120 skeletonizes a tree trunk with twigs as 2D, and represents the skeletonized tree trunk as a graph. Here, the tree trunk is re-skeletonized using the graph representation scheme of 2D object that is controlled by a user by receiving the alpha matte image extracted in the matte image generating unit 110.

Such a method has an advantage that it accurately extracts a skeleton of a corresponding object even in an object having a lot of deformations and protrusions such as a tree.

More specifically, the object skeleton graph generating unit 120 configures a convex hull with respect to the matte image generated in the matte image generating unit 110, and extracts minimal critical points for constituting a shape of a skeleton on the configured convex hull. In this process, a user input may be allowed.

In addition, the object skeleton graph generating unit 120 segments contours of an object on the convex hull with respect to the extracted critical points, and removes a skeleton line included in the same contour, thereby extracting only the skeleton line that refers to mutually different contours. In order to more accurately extract the skeleton line of the object, user interaction with respect to extraction selection may be allowed when extracting the minimal critical points constituting the convex hull shape of the object.

That is, when the extracted critical points are displayed on a region of the screen (not shown) designated in advance, through the image visualization unit 160, a user may inquire the displayed critical points, and then set an option for extracting the critical points through the user edition menu 950 provided through the user menu providing unit 170 to thereby change the critical points.

In this instance, the generated object skeleton graph is represented as a DAG, a single pixel is allocated for each node, a bifurcation of the branch is represented as a junction node, and an end point of the branch is represented as an end node.

Next, the primary tree model generating unit 130 generates a depth information value in each node on the object skeleton graph generated in the object skeleton graph generating unit 120 in accordance with a predetermined rule, and allocates the generated depth information value, thereby generate a 3D primary tree model.

That is, the primary tree model generating unit 130 performs conversion of a 2D tree skeleton into a 3D prototype and construction of a whole 3D tree model with respect to the object skeleton graph. Here, the primary purpose of the conversion of the 2D tree skeleton into the 3D prototype is to generate the depth information value in each node 320 within the object skeleton graph and allocate the generated depth information value so that a tree naturally viewed in various viewpoints is generated while maintaining a geometry structure of the critical branches of an original image.

As shown in FIG. 9, the primary tree model may be also displayed on a tree model region 930 of a screen designated in advance, through the image visualization unit 160. Here, a user may inquire the displayed primary tree model, and then edit an image of the corresponding region 930 using the user edition menu 950 provided through the user menu providing unit 170.

Meanwhile, on the assumption that the critical nodes (junction nodes and end nodes) within the graph shown in FIG. 3 are more diverged as a distance from the root node 360 extracted as a root is longer, a 3D representation is performed. However, a first junction node 340 directly connected to the root node 360 and nodes 370 between the nodes 340 and 360 are measured in a similar manner.

In a direction similar to an average normal line direction of adjacent nodes (regarded as a branch direction), depth values of the remaining critical nodes follow a distribution of $Z \sim N(\mu_z, \sigma_z)$. Here, $Z$ denotes a depth value of corresponding adjacent critical nodes.

The secondary tree model generating unit 140 adds branches to the primary tree model based on a branch library constructed in advance and a predetermined rule, thereby generating a secondary tree model. In this instance, a divergency angle of each critical node on the primary tree model and branch length information may be used.

That is, in order to generate a whole tree model with respect to the primary tree model that is a 3D initial tree model, the secondary tree model generating unit 140 adds branches to the given primary tree model using various types of branch libraries constructed in advance and predetermined rules, thereby generating the whole tree model.

In this instance, the divergency angle of each of the critical nodes on the primary tree model and a branch length value are utilized. In addition, the divergency angle and the branch length value may be utilized to generate four types of branch models defined in advance so as to maintain a feeling of the generated tree shape. The secondary tree model may also reflect a user input through the user interface.

The tertiary tree model generating unit 150 may perform self-growth representation with respect to the secondary tree model based on a distance between each node on the object skeleton graph generated in the object skeleton graph generating unit 120, thereby generating a tertiary tree model.

That is, the tertiary tree model generating unit 150 measures a geodesic distance between each node on the object skeleton graph generated in the object skeleton graph generating unit 120 and a geodesic distance from each node to a root node, and sets the measured distances as branch-ordering values for determining the order of growth of the branches.

Next, the tertiary tree model generating unit 150 performs self-growth representation with respect to the secondary tree model using a branch-ordering value, thereby generating the tertiary tree model. In this instance, the branch-ordering value may be set so that speeds of the order of growth of the branches are proportional to branch thicknesses and inversely proportional to a distance from the root node to the branches.

That is, more specifically, the tertiary tree model generating unit 150 expresses a tree model self-growth representation operation, measures the geodesic distance between nodes existing on a tree manifold space utilizing a graph structure of the tree object obtained as results of skeletonization of a tree trunk as 2D and representation as a graph in the above-described object skeleton graph generating unit 120, and then uses the distance from each node to the root node as the branch-ordering value for determining the order of growth of branches.

In addition, as described above, on the three assumptions, the tertiary tree model generating unit 150 performs self-growth representation with respect to the whole tree model (secondary tree model) generated in the secondary tree model generating unit 140. Here, the three assumptions are as follows.

First, a newly generated branch node is farthest from the root node.

Second, the branch having a thinner thickness than adjacent branches is highly likely to be a recently and newly generated branch.

Third, a whole shape of the tree must be roughly maintained through the overall growth process, but a geometric shape is not the same.

Through such assumptions, branch thicknesses and tree self-growth simulation representation may be performed. In addition, the above-described growth representation elements may be adjusted in accordance with user intention, whereby a variety of tree self-growth representations are possible.

As shown in FIG. 9, the tertiary tree model generated in this manner may be also displayed on the tree model region 940 of the screen designated in advance, through the image visualization unit 160. Here, a user may inquire the displayed critical points, and then generate a final tree model in which a user input is reflected to the tertiary tree model displayed on the screen 940, using the user edition menu 950 provided through the user menu providing unit 170.

That is, various tree models in which shape elements of the tree selected by a user through the user edition menu 950, for example, presence and absence of leave setting, a degree of richness of twigs, a tropism direction and degree of twigs, and the like are reflected to the tertiary tree model generated in the tertiary tree model generating unit 150 may be generated.

Next, a forest model generating method according to an embodiment of the present invention will be described. A tree model used for generating a forest model may be a tree model generated through the tree model generating apparatus and method according to an embodiment of the present invention.

Hereinafter, descriptions will be made with reference to drawings.

Figure 10:
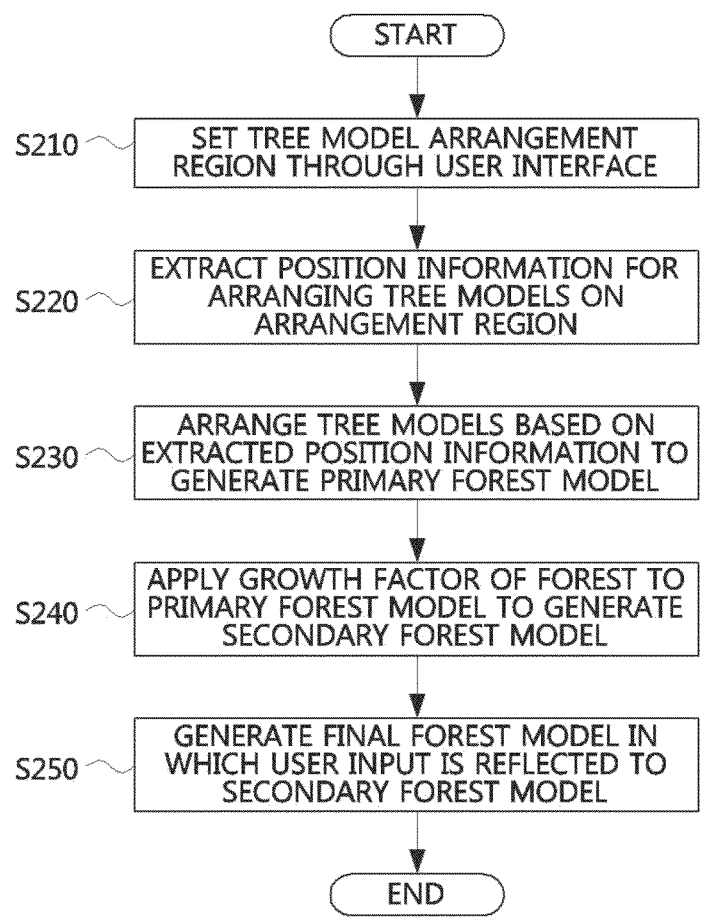
FIG. 10 is a flowchart illustrating a forest model generating process according to another embodiment of the present invention.

FIG. 10 is a flowchart illustrating a forest model generating process according to another embodiment of the present invention.

Referring to FIG. 10, the forest model generating process according to an embodiment of the present invention may include operation S210 of setting a tree model arrangement region, operation S220 of extracting arrangement region position information, operation S230 of generating a primary forest model, operation S240 of generating a secondary forest model, and operation S250 of generating a final forest model.

In addition, referring to FIG. 10, each operation of the forest model generating process according to an embodiment of the present invention will be described in more detail as follows.

First, in operation S210, a specific terrain model is displayed on a computer screen by a user, and an arrangement region for grouping and arranging specific tree models on the specific terrain model is selected.

Figure 11:
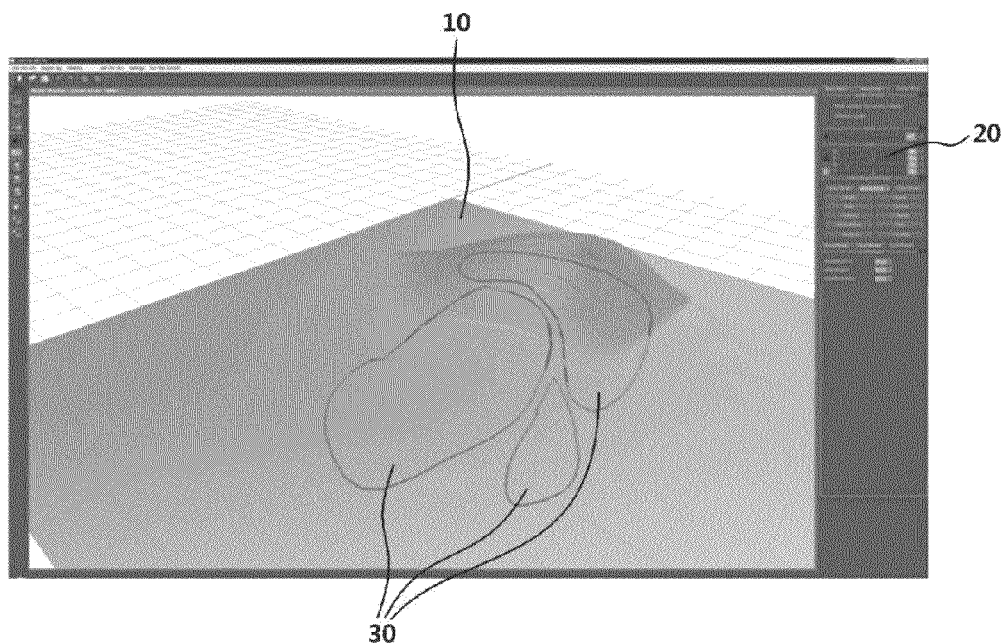
FIG. 11 is a conceptual diagram illustrating an interface for setting a user region in an arbitrary terrain in a forest model generating process according to an embodiment of the present invention.

In operation S210, an example of a user interface in which the tree model arrangement region is selected by a user is shown in FIG. 11.

FIG. 11 is a conceptual diagram illustrating an interface for setting a user region in an arbitrary terrain in a forest model generating process according to an embodiment of the present invention.

Referring to FIG. 11, an arbitrary terrain 10 is displayed on the left side of the screen, and setting menus 20 selectable by a user are displayed on the right side.

In addition, within the arbitrary terrain 10, a user region 30 set by a user so as to arrange tree models is displayed.

The terrain 10 displayed on the screen may be received from the outside or selected from internally generated terrains.

Next, in operation S220, position information for arranging tree models on the arrangement region 30 selected by a user may be extracted using at least one arrangement pattern set in advance.

Figure 12:
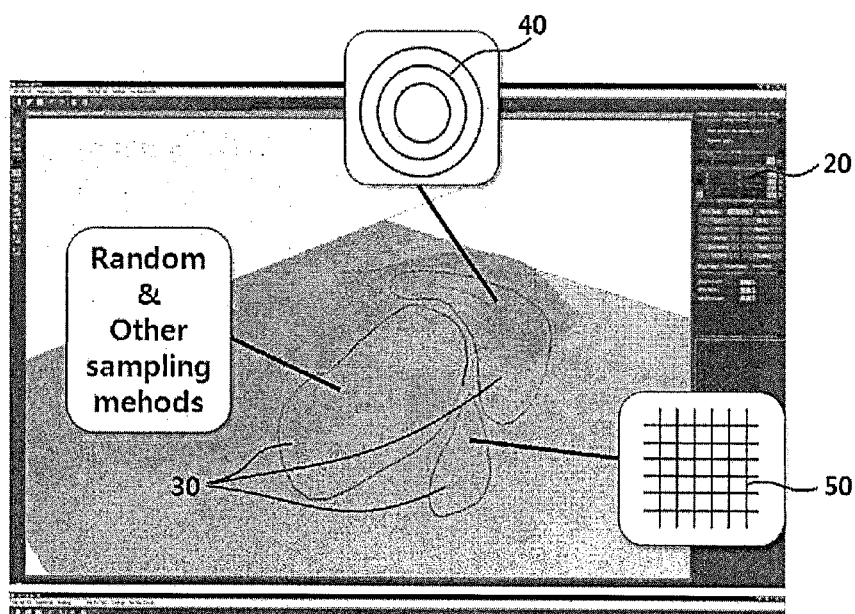
FIG. 12 is a conceptual diagram illustrating a position extraction result for arranging trees in a forest model generating process according to an embodiment of the present invention.

FIG. 12 is a conceptual diagram illustrating a position extraction result for arranging trees in a forest model generating process according to an embodiment of the present invention.

Referring to FIG. 12, in operation S220, position information for arranging tree models within the region 30 set by a user may be automatically extracted, and position information 40 for arranging the tree models within the region 30 set by the user may be extracted using a plurality of preset arrangement patterns 50 defined in advance.

In this instance, the user may select a (preset or arbitrary) pattern in which tree models are arranged, the number of tree models to be arranged, density, and the like through the setting menu 20.

In operation S230, based on the position information extracted in operation S220, a primary forest model may be generated by arranging at least one type of tree models generated in advance.

In this instance, as shown in FIG. 12, a user may edit types of grouped trees, shapes of trees, a rotation method of a tree shaft, a tropism direction of the tree, presence and absence of leaves, and a growth representation method of the tree through the setting menu 20.

In operation S240, a predetermined growth factor of a forest is applied to the primary forest model, and self-growth representation of the forest is performed based on the applied growth factor to generate a secondary forest model.

In operation S250, a final forest model in which a user input is reflected to the secondary forest model is generated through a user interface.

Figure 13:
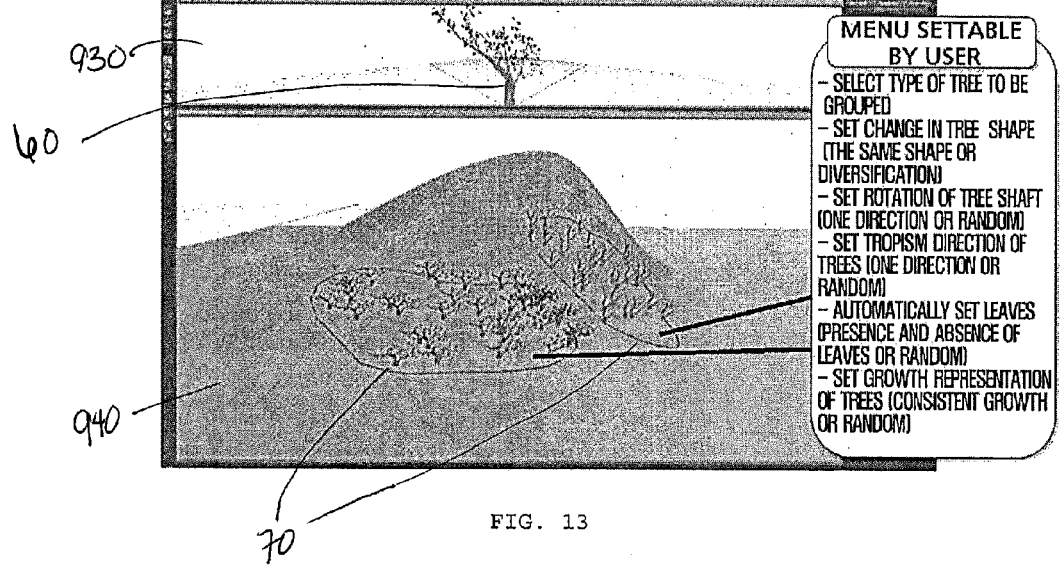
FIG. 13 is a conceptual diagram illustrating a forest model generated in a forest model generating process according to an embodiment of the present invention.

FIG. 13 is a conceptual diagram illustrating a forest model generated in a forest model generating process according to an embodiment of the present invention.

Referring to FIG. 13, tree models 60 to be arranged in a forest model are selected through a tree model visualization window 930 using a tree model (see FIG. 7) generated in advance, and various tree groups 70 are displayed through a forest model visualization window 940 based on the position information extracted in operation S220 with respect to the region 30 set by a user.

As described above, when the tree model and forest model generating method and apparatus according to the embodiments of the present invention is used, contents related to a digital tree (3D virtual tree manufactured as CG image) and a digital forest (3D virtual forest manufactured as CG image) which are inserted to films, games, advertisements, and the like may be efficiently generated.

In addition, various tree trunk-based 3D tree models may be generated from an actual tree image, and implemented through optimized graph skeletonization with respect to a tree that is an arbitrary 2D object, representation of a 2D tree as a 3D tree model, and tree self-growth representation. In addition, 3D tree representation having various shapes in which user intentions such as branch shapes, a degree of richness of branches, a degree of tropism of branches, presence and absence of leaves, leave shapes, self-growth types, and the like are reflected is possible.

In addition, various types of 3D forests may be represented on an arbitrary terrain, and various 3D forests in which user intentions such as user region setting within the terrain, automatic extraction of planting position within the set region, planting pattern setting, direction setting of trees, and the like are reflected, forest self-growth representation, and generation of a tree model and forest model are represented and controlled by a single integrated system, and therefore generation of the tree model and forest model and the related content production may be easily and rapidly performed.

While the example embodiments of the present invention and their advantages have been described in detail, it should be understood that various changes, substitutions, and alterations may be made herein without departing from the scope of the invention.

What is claimed is:

1. A tree model generating method comprising:
separating and extracting a skeleton of a tree from an image including the tree to generate a matte image;
applying a graph representation scheme of a two-dimensional (2D) object to the matte image to generate an object skeleton graph;
generating a depth information value in accordance with a predetermined rule and allocating the generated depth information value to each node on the object skeleton graph to generate a three-dimensional (3D) primary tree model;
adding branches to the primary tree model based on a branch library constructed in advance and the predetermined rule to generate a secondary tree model; and
performing self-growth representation with respect to the secondary tree model based on a distance between each node on the object skeleton graph to generate a tertiary tree model.

2. The tree model generating method of claim 1, further comprising:
reflecting, to the tertiary tree model, at least one shape element of the tree selected by a user through a user interface to generate at least one final tree model.

3. The tree model generating method of claim 1, wherein, in the separating and extracting of the skeleton of the tree, a user scribble-based matting scheme is used to generate the matte image.

4. The tree model generating method of claim 1, wherein the applying of the graph representation scheme includes:
configuring a convex hull with respect to the matte image generated in the separating and extracting of the skeleton of the tree;
extracting a minimal critical point for constituting a shape of a skeleton on the convex hull;
segmenting contours of an object on the convex hull with respect to the extracted critical point; and
removing a skeleton line included in the same contour to extract the skeleton line that refers to mutually different contours,
wherein, in the extracting of the minimal critical point, interaction with a user through a user interface is allowed.

5. The tree model generating method of claim 1, wherein the object skeleton graph generated in the applying of the graph representation scheme is represented as a directed acyclic graph (DAG), a single pixel is allocated for each node, a bifurcation of the branch is represented as a junction node, and an end point of the branch is represented as an end node.

6. The tree model generating method of claim 1, wherein the generating of the depth information value includes generating the 3D tree model on the assumption that each node on the object skeleton graph is more diverged as a distance from a root node is longer, and measuring depth information values of a first junction node directly connected to the root node and of nodes between the root node and the junction nodes in a similar manner.

7. The tree model generating method of claim 1, wherein, in the adding of the branches, a divergency angle of each critical node on the primary tree model and branch length information are used when generating the secondary tree model.

8. The tree model generating method of claim 1, wherein the performing of the self-growth representation includes:
measuring a geodesic distance between each node on the object skeleton graph generated in the applying of the graph representation scheme and a geodesic distance from each node to a root node, and setting the measured distances as branch-ordering values for determining the order of growth of the branches; and
performing self-growth representation with respect to the secondary tree model using the branch-ordering values to generate the tertiary tree model.

9. The tree model generating method of claim 8, wherein the branch-ordering value is set to satisfy a condition in which speeds of the order of growth of the branches are proportional to branch thicknesses and inversely proportional to a distance from the root node to the branches.

10. A forest model generating method comprising:
receiving, from a user, an arrangement region for grouping and arranging tree models on a specific terrain model displayed on a computer screen;
extracting position information for arranging the tree models on the received arrangement region using at least one arrangement pattern set in advance;
arranging at least one type of tree model generated in advance on the arrangement region based on the extracted position information to generate a primary forest model; and
performing self-growth representation, with respect to the primary forest model, of a forest to which a predetermined growth factor of the forest is applied to generate a secondary forest model,
wherein the tree models are based on a skeleton of a tree from an image including the tree to generate a matte image,
wherein a graph representation scheme of a two-dimensional (2D) object is applied to the matte image to generate an object skeleton graph, and
wherein a three-dimensional (3D) primary tree model is generated from a depth information value applied to each node on the object skeleton graph.

11. The forest model generating method of claim 10, further comprising:
generating a final forest model in which a user input is reflected to the secondary forest model through a user interface.

12. The forest model generating method of claim 11, wherein, in the generating of the final forest model, at least one of a type and shape of each of trees grouped on the primary forest model or the secondary forest model, a rotation method of a tree shaft, a tropism direction of the tree, presence and absence of leaves, and a growth representation method of the tree is provided so as to be edited through the user interface.

13. A tree model generating apparatus that receives an image including a tree to generate a tree model, comprising:
a computing device configured to:
separate and extract, by a matte image generating unit, a skeleton of the tree from the image including the tree to generate a matte image using a user scribble based-matting scheme;
apply, by an object skeleton graph generating unit, a graph representation scheme of a 2D object to the matte image to generate an object skeleton graph;
generate, by a primary tree model generating unit, a depth information value in accordance with a predetermined rule and allocate the generated depth information value to each node on the object skeleton graph to generate a 3D primary tree model;

add, by a secondary tree model generating unit, branches to the primary tree model based on a branch library constructed in advance and the predetermined rule to generate a secondary tree model; and perform, by a tertiary tree model generating unit, self-growth representation with respect to the secondary tree model based on a distance between each node on the object skeleton graph to generate a tertiary tree model.

14. The tree model generating apparatus of claim 13, wherein the computing device is further configured to:

display, by an image visualization unit, at least one image of the image including the tree, the matte image, the object skeleton graph, the primary tree model, the secondary tree model, and the tertiary tree model on a screen; and provide, by a user menu providing unit, a user menu so that the image displayed through the image visualization unit is edited by the user.

15. The tree model generating apparatus of claim 13, wherein the object skeleton graph generating unit configures a convex hull with respect to the matte image generated in the matte image generating unit, extracts a minimal critical point for constituting a shape of a skeleton on the convex hull, segments contours of an object on the convex hull with respect to the extracted critical point, and removes a skeleton line included in the same contour to extract the skeleton line that refers to mutually different contours.

16. The tree model generating apparatus of claim 13, wherein the object skeleton graph generated in the object skeleton graph generating unit is represented as a DAG, a single pixel is allocated for each node, a bifurcation of the branch is represented as a junction node, and an end point of the branch is represented as an end node.

17. The tree model generating apparatus of claim 13, wherein the primary tree model generating unit generates the 3D tree model on the assumption that each node on the object skeleton graph is more diverged as a distance from a root node is longer, and measures depth information values of a first junction node directly connected to the root node and of nodes between the root node and the junction nodes in a similar manner.

18. The tree model generating apparatus of claim 13, wherein the secondary tree model generating unit uses a divergency angle of each critical node on the primary tree model and branch length information when generating the secondary tree model.

19. The tree model generating apparatus of claim 13, wherein the tertiary tree model generating unit measures a geodesic distance between each node on the object skeleton graph and a geodesic distance from each node to a root node, and performs self-growth representation with respect to the secondary tree model using the measured distance as a branch-ordering value for determining the order of growth of the branches, to generate the tertiary tree model.

20. The tree model generating apparatus of claim 19, wherein the branch-ordering value is set to satisfy a condition in which speeds of the order of growth are proportional to branch thicknesses and inversely proportional to a distance from the root node to the branches.

* * * * *